Patented Nov. 18, 1924.

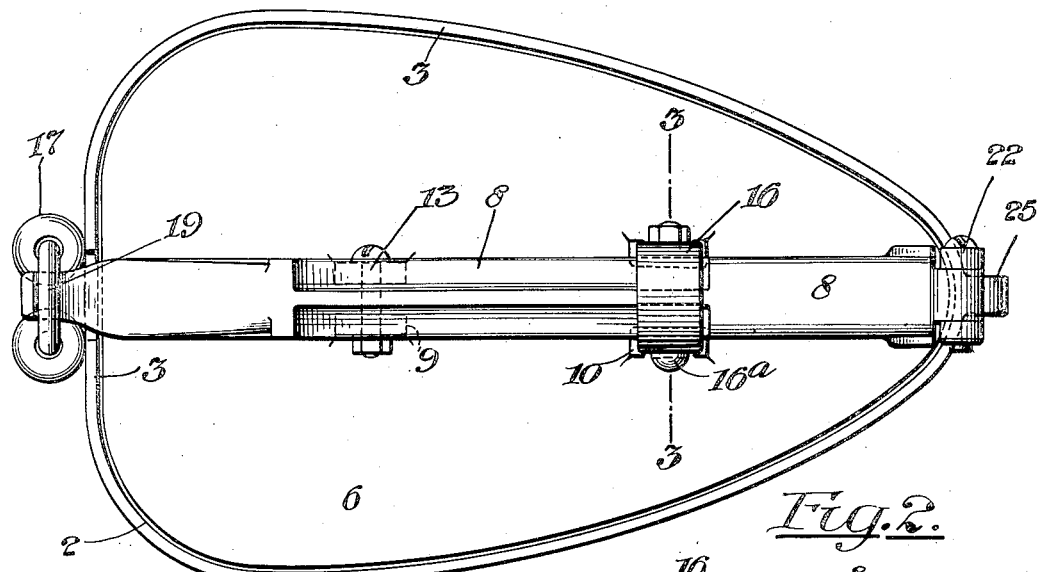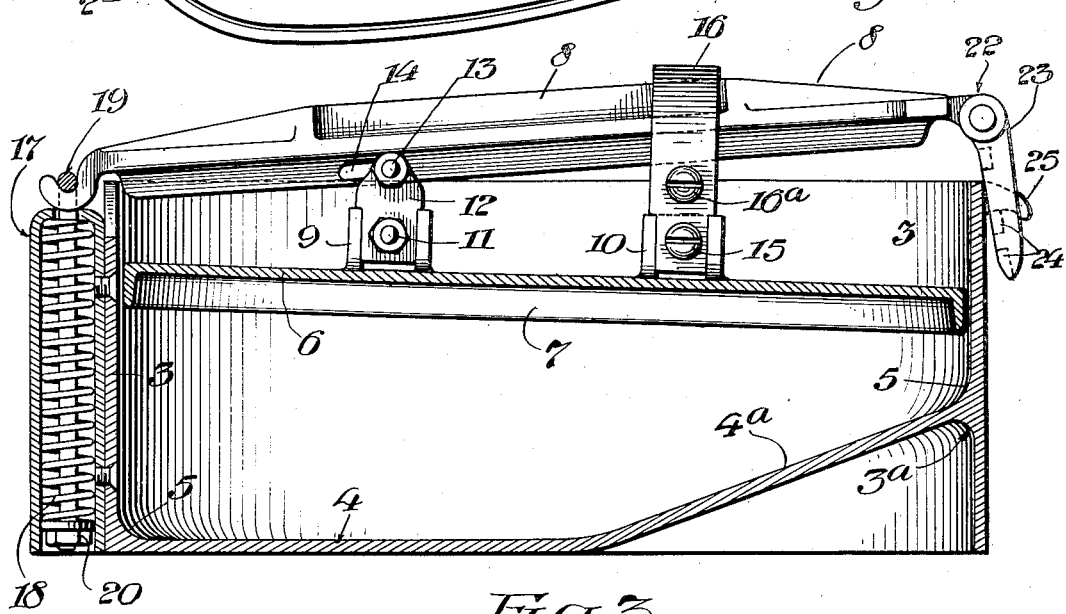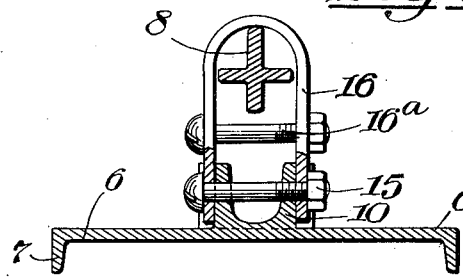

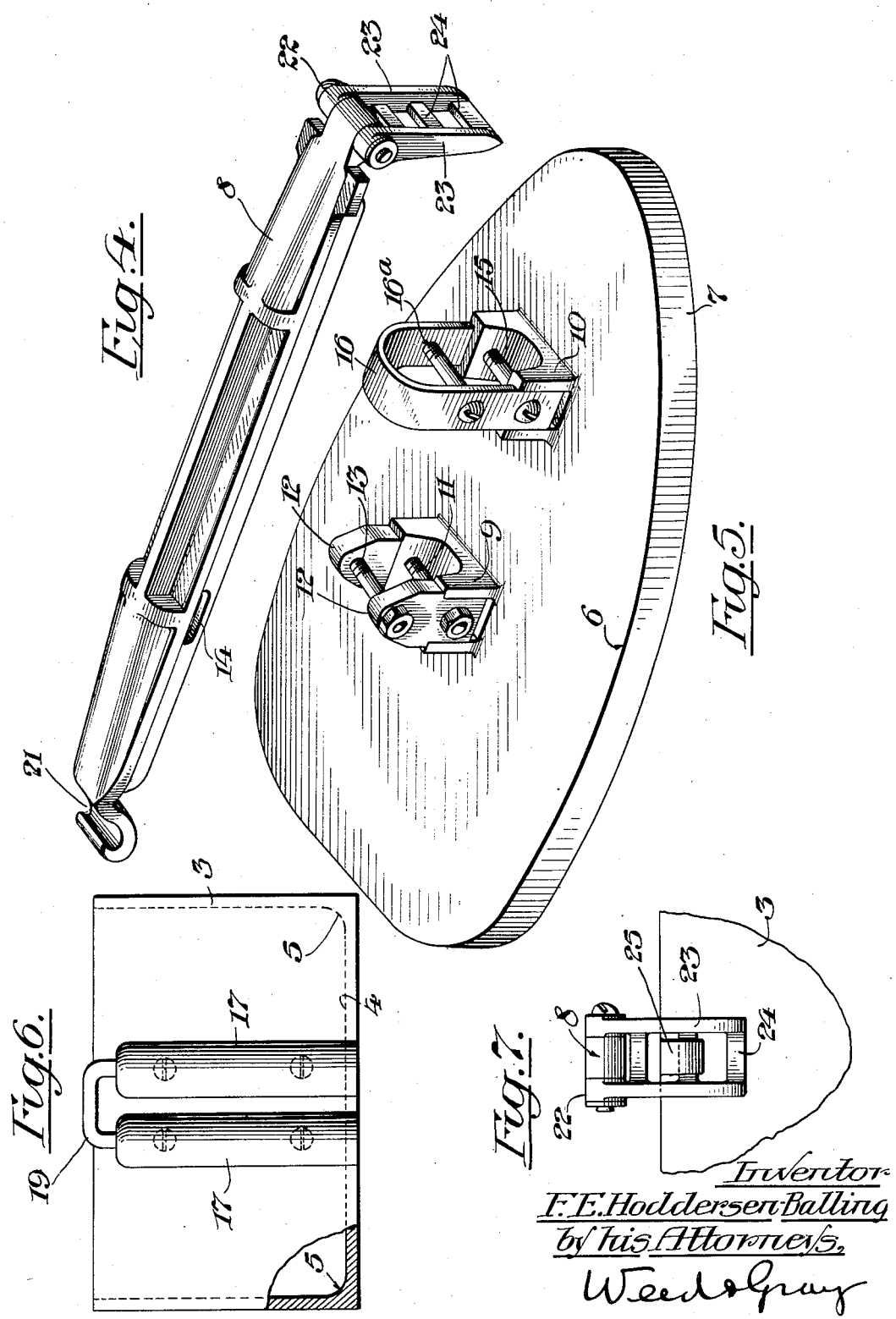

1,516,383

UNITED STATES PATENT OFFICE.

FREDERICK EDWARD HODDERSEN-BALLING, OF BROOKLYN, NEW YORK.

HAM BOILER.

Application filed May 27, 1922. Serial No. 564,036.

*To all whom it may concern:*

Be it known that I, FREDERICK EDWARD HODDERSEN-BALLING, a citizen of the United States, residing at Brooklyn, in the county of Kings and State of New York, have invented certain new and useful Improvements in Ham Boilers, of which the following is a specification.

This invention relates to cookers, more particularly to that class thereof usually known as ham boilers or cookers, although it will be understood that the present improved cooker may if desired, be used for cooking various kinds of meat products, an object of the invention being to provide an improved ham boiler very simple in construction and operation, inexpensive to manufacture, and highly efficient in use.

A further object of the invention is the provision of an improved ham boiler so constructed that it will more nearly conform to the shape of the ham to be cooked, thereby eliminating a large amount of the waste in the ham during the slicing thereof, which has heretofore occurred in the use of ordinary ham boilers now on the market.

A further object of the invention is the provision of an improved ham boiler having an improved means for supporting and manipulating the cover, whereby the ham is not only subjected to suitable pressure to properly shape the same while permitting it to properly expand during the cooking thereof, but which cover can be readily and quickly attached or detached, and easily manipulated. In the present instance a handle bar is connected to the cover at a normally fixed angle, and the handle bar is adapted to be connected to the receptacle by mechanism permitting the cover to be adjusted at various angles to the bottom of the receptacle thereby enabling the cover to conform to the shape of the ham.

Another object of the invention is the provision of an improved ham boiler in which there are no angular corners for the settling of the water and the formation of a jelly difficult to remove from the ham and from the cooker, and which usually requires in consequence a considerable waste of time in removing the same from the ham as well as the cooker.

In the drawings accompanying and forming a part of this specification, Fig. 1 is a top view of this improved ham boiler; Fig. 2 is a longitudinal section thereof; Fig. 3 is a cross sectional view taken on line 3—3 Fig. 1; Fig. 4 is a perspective view of the handle lever detached; Fig. 5 is a perspective detail view of the cover; Fig. 6 is a left-hand end view of Fig. 1 partly in section; and Fig. 7 is a detail view of the fastening means at the right-hand end of Fig. 1.

Similar characters of reference indicate corresponding parts in the several figures of the drawings.

In the use of ham boilers, the ham is suitably dressed by the removal of the bones and inedible parts preliminary to the cooking, and as it has a large rounded end and a smaller knuckle end it follows that when placed in a boiler of ordinary construction, there is considerable waste space in the boiler around the knuckle end of the ham. In other words the boiler at the knuckle end of the ham has been considerably larger than the ham at such end, so that when the height of the boiler at the knuckle end is the same as at the opposite end of the ham, which of course is made of sufficient height to receive the large end of the ham, it follows that at the knuckle end thereof the boiler is too large for the ham, thus leaving considerable space for the accumulation of fat, jelly, etc. Consequently when the ham is boiled and sliced, there is an accumulation of waste and fat at the knuckle end which must be either thrown away or sold at a small price, this accumulation being due to the fact that when the ham is subjected to pressure in the boiler, this fat and waste is forced into the space around the knuckle end of the ham. Moreover, since these cooking receptacles are provided with angular corners, the water settles in these corners and jellies and also forms a jelly around the ham, which is difficult to remove from the ham as well as from the cooker. Thus, considerable time is wasted in cleaning the ham, and also the cooker for re-use.

The present improvement obviates these difficulties and disadvantages in that the boiler is so constructed that it more nearly conforms to the shape of the ham to be cooked, and therefore as the ham fits more perfectly into the cooker, it follows that when subjected to pressure there is no opportunity for the fat and skin to be pressed toward the knuckle end and thus form a waste product, which has been the case in the old style cookers wherein a considerable portion of the fat and skin was forced toward the knuckle end of the ham. This was due to the fact that the cooker was not properly shaped to conform to the ham, and therefore in slicing the knuckle end of the ham the slices were largely made up of fat, and therefore unsalable.

This improved ham boiler in the preferred form thereof shown comprises a receptacle body 2, which may be if preferred, in the form of an aluminum casting having the general shape of the ham to be cooked. The upright walls 3 forming the sides of the cooker and bottom 4 are provided with curved or rounded corners 5 all around the inner edges of the bottom (see Figs. 2 and 6), thus eliminating sharp corners and angles in which heretofore the water in which the ham was boiled settled and formed a jelly which required time and labor to remove from the ham and the cooker so as to permit the latter to be reused.

In the present instance it will thus be observed that the side walls are not only inclinedly curved in the direction of their length so, as it were to conform to the shape of the ham, but that all angular corners connecting the bottom with the walls are eliminated. The bottom wall 4 at the forward end of the cooker or at the knuckle end of the ham is inclined upwardly at 4ᵃ to conform to the shape of the knuckle of the ham, thus eliminating considerable space at this point around the ham and preventing the accumulation of excess fat. It will be noted that the opposite side walls are of substantially the same height so that the lower edges thereof are in the same horizontal plane. Thus the edges of the inclined portion 4ᵃ terminate intermediate the upper and lower edges of the walls as at 3ᵃ. It will also be noted that the flat faces of the bottom wall and side walls are united by curved portions, which in the present instance are of increased thickness, thus eliminating angular corners and increasing the strength of the receptacle.

For closing the cooker a suitable cover 6 is provided adapted to fit therein, the cover having a downwardly extending flange or rim 7 fitting within the upright side walls of the body. Suitably connected to the cover is a combined operating lever and handle 8.

In the present instance the cover is provided with a pair of alined U-shaped brackets 9 and 10. Secured to one, as the rear bracket, by a suitable bolt 11 is a pair of upright lugs or members 12 having therebetween a pivot bolt 13 adapted to pass through an elongated slot 14 of the handle lever, thereby forming what may be considered as a movable pivotal connection. Bolted by a suitable bolt 15 to the other U-shaped bracket is a yoke 16 carrying a bolt or rod 16ᵃ located beneath the bottom of the handle lever, which latter passes through the yoke.

This handle lever is so constructed in cross section that it is sufficiently strong and rigid to meet the requirements thereof. At the larger end of the boiler on the outside is secured a pair of cylindrical casings 17 in each of which is located a coiled spring 18. Passing through these coiled springs and openings in the tops of these casings is a U-shaped rod 19, the lower ends of which carry a pair of nuts and washers 20. The upper bowed end of this rod extends above the casings in position to be engaged by a hook 21 on the end of the lever 8. The forward end of the lever is provided with one member of a suitable fastening means, which in the present instances comprises a pivoted member 22 pivotally secured to the forward end of the handle lever. This member of the fastening means comprises a pair of bars 23 having a suitable number of cross bars 24 therebetween. The other member of the fastening means comprises a suitable tooth or projection 25 carried by the body and adapted to be engaged by any one of the cross bars of the fastening means.

It will be observed that the handle is so connected with the cover that when the cover is within the body of the receptacle it is inclined downwardly toward the upwardly inclined bottom so that the bottom and the cover at this point form a space closely approximating the form of the knuckle end of the ham. In other words, the handle lever is so connected with the cover that there is a greater distance between the cover and the handle lever adjacent to one end than there is adjacent to the other. Furthermore it will be seen that when the handle bar is forced downwardly the spring connections at one end and the fastening member 22 at the opposite end cooperate to enable the cover to be disposed or tilted at different angles relatively to the bottom of the receptacle, such connections acting as adjusting means for adjusting the cover to conform to the shape of the ham.

In operation when the ham has been suitably dressed, it is placed in the boiler, the cover is placed on top thereof, and the hooked end 21 of the handle lever placed in engagement with the spring rods, this being permitted by the slot 14 in the lever. Thereupon by depressing the forward end of the lever the springs are expanded and the desired pressure placed upon the ham, this being permitted according to the size and shape of the ham, by the swinging fastening means 22—25 at the forward end of the lever, since any one of the cross bars 24 may be brought into engagement with the projecting tooth or lug 25 as occasion requires. Thus, it will be observed that by means of the inclined bottom wall and the inclination of the cover, the top and bottom of the casing conform very closely to the shape of the knuckle portion of the ham, and as the side walls of the casing are shaped likewise to conform to the shape of the ham, it follows that there is no excess space in the cooker for the accumulation of fat and the waste product of the ham. Hence, when the ham is cooked the fat and skin thereof are more thoroughly apportioned or equalized around the ham, and not all pressed toward the knuckle end thereof as heretofore. Consequently when the slicing of the ham takes place, the slices at the knuckle end of the ham are equally as salable a product as those at the larger end of the ham. It has been estimated that this construction of boiler conforming to the shape of the ham saves approximately fifty per cent of the heretofore waste portion of the ham.

Furthermore, in the present improvement the cover is more readily and quickly attached and detached than heretofore, and is very much simplified in construction, since the springs are carried by the body and not by the cover, and consequently there is less weight in the handling of the cover, while considerable pressure can be applied to the cover more readily and with a minimum effort by reason of the improved leverage construction shown and described herein. There is also a more uniform pressure upon the cover by the location of the springs in the manner described. Furthermore, the construction also facilitates the attachment and detachment of the cover, especially as the present organization eliminates duplicate sets of fastening means at opposite ends of the body, and also eliminates any special means for regulating the spring pressure, since when nuts at the lower ends of the coil springs are once adjusted, the adjustment thereafter is sufficient.

It will be understood that by describing in detail herein any particular form, structure, or arrangement it is not intended to limit the invention beyond the terms of the several claims or the requirements of the prior art.

I claim as my invention:

1. In a ham boiler the combination of a receptacle, a cover therefor, a handle bar for manipulating said cover, means for connecting said bar to the cover at a normally fixed angle thereto, and connecting means between said bar and receptacle for adjusting said cover at various angles to the bottom of the receptacle.

2. In a ham boiler the combination of a receptacle, a cover therefor, and a handle lever having a shiftable connection with said cover, said receptacle at one end being upwardly inclined and said cover at the corresponding end thereof being downwardly inclined.

3. In a ham boiler the combintion of a receptacle, a cover therefor, a handle lever connected to the cover and resilient means connecting said handle lever and receptacle, said receptacle at one end being upwardly inclined and said cover at the corresponding end thereof being downwardly inclined.

4. In a ham boiler, the combination of a body, a cover therefor, a spring carried by the body, a handle connected with the spring and with the cover, and means for fastening the handle lever at one end of the body.

5. In a ham boiler, the combination of a body, a cover, means connected with the cover for supporting the same, means for fastening said supporting means at one end of the body, and resilient means having connection with the supporting means at the opposite end of the body.

6. In a ham boiler, the combination of a body, a cover, a handle lever connected therewith, means for fastening the handle lever at one end of the body, and resilient means having detachable connection with the handle lever at the opposite end of the body.

7. A ham boiler comprising a body having an upwardly inclined bottom wall, a cover, means for supporting the cover, resilient means carried by the body and connected with said supporting means at one end of the body and fastening means for the cover supporting means at the opposite end of the body.

8. A ham boiler comprising a receptacle having a bottom wall and upright side walls having rounded or curved corners of increased thickness, an upwardly inclined bottom portion, a cover, and means for supporting it, and means for connecting said supporting means to the cover at a constant angle thereto.

9. A ham boiler comprising a receptacle, a cover, and means for manipulating the cover, said cover having a pair of connections with said manipulating means and engaging the latter at different distances from the cover.

10. A ham boiler comprising a body having its bottom and side walls shaped to conform to the shape of the ham, a cover conforming to the shape of the ham, means for manipulating said cover and comprising a handle lever, resilient means carried by and outside of one end of the body for connection with one end of the handle lever, and means for fastening the other end of the handle lever at the opposite end of the body.

11. A ham boiler comprising a receptacle having opposite vertical walls of substantially the same height, and a bottom wall having a horizontal portion and an inclined portion joined to one of said vertical walls above the bottom thereof.

12. A ham boiler comprising a receptacle having opposite upright walls terminating at the top and bottom thereof in substantially the same horizontal planes and a bottom wall having a pair of angularly related portions intermediate said walls, one of said portions joined to one of said upright walls above the bottom thereof.

13. A ham boiler comprising a receptacle having enclosing walls terminating in the same horizontal plane at the lower edges thereof, and a bottom wall having a part only inclined intermediate said walls.

14. A ham boiler comprising a receptacle having enclosing walls including a vertical end wall, and a bottom, the latter having the end thereof terminating between the upper and lower edges of said end wall.

15. A ham boiler comprising a receptacle, a cover therefor, and a handle lever for manipulating the cover and having a movable pivotal connection therewith.

16. A ham boiler comprising a receptacle, a cover therefor, a handle lever for manipulating the cover and having a movable connection therewith, a spring connection for the lever at one end thereof, and a releasable connection at the other end thereof.

17. A ham boiler comprising a receptacle, a cover therefor, a handle lever for manipulating the cover and having a pivotal connection therewith, a releasable spring connection for the lever at one end thereof, and an adjustable connection at the other end thereof.

18. In a ham boiler, the combination of a receptacle, a cover therefor, and handle means for supporting and manipulating the cover, said means having a resilient connection at one end only with the receptacle.

19. In a ham boiler, the combination of a receptacle, a cover therefor, and handle means for supporting and manipulating the cover, said means having a resilient connection at one end with the receptacle and a shiftable connection with the cover.

20. In a ham boiler, the combination of a receptacle, a cover therefor, means for supporting and manipulating the cover, said means having a resilient connection at one end with the receptacle and a shiftable connection with the cover, and an adjustable connection at the opposite end.

21. In a ham boiler, the combination of a receptacle, a cover therefor, resilient means for permitting yieldable operation of the cover, and a manipulating lever having detachable connection with said resilient means.

22. A ham boiler comprising a receptacle, a cover, a handle member extending across the top of the cover, and means for connecting said member to the cover at an angle thereto.

23. A ham boiler comprising a receptacle, a cover, and a handle lever for operating the cover, said lever having a spring fulcrum at one end of the receptacle and an adjustable connection at the opposite end, and said cover having a pair of connections with said lever and engaging the latter at different distances from the cover.

Signed at 1822 Park Row Building, New York city, New York, this 26th day of May 1922.

FREDERICK EDWARD HODDERSEN-BALLING.